Sept. 11, 1934.   D. E. PAYNE   1,972,948
HYDROGENATION OF OILS
Filed May 24, 1930
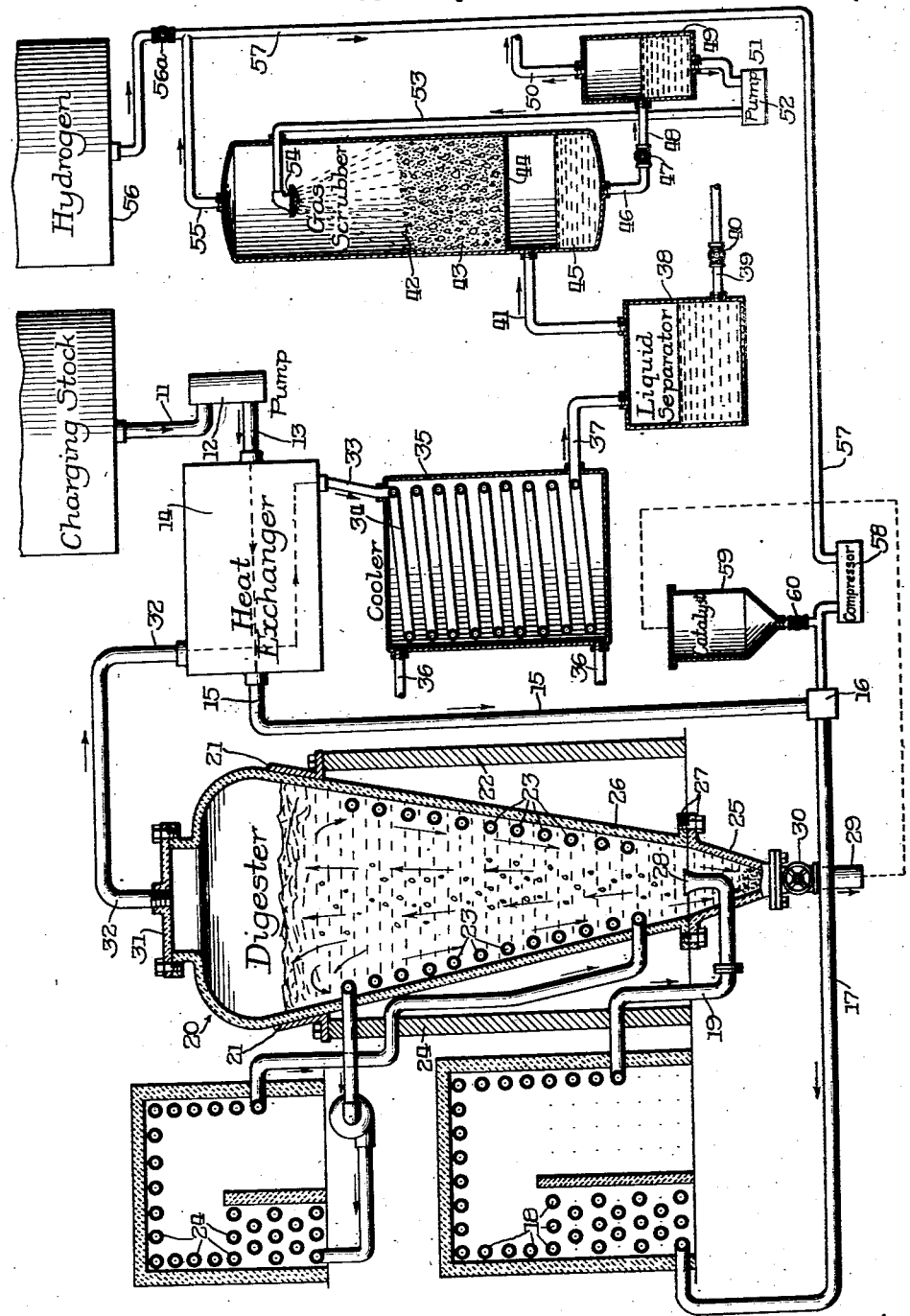
Inventor:
Donald E. Payne
By Bruce K. Brown  atty.

Patented Sept. 11, 1934

1,972,948

UNITED STATES PATENT OFFICE 1,972,948

HYDROGENATION OF OILS

Donald E. Payne, Chicago, Ill., assignor to Standard Oil Company (Indiana), Chicago, Ill., a corporation of Indiana Application May 24, 1930, Serial No. 455,210

7 Claims. (Cl. 196—53)

This invention relates to an improved apparatus and process for the liquid-phase hydrogenation of oil. The process may be used for hydrogenating any oil of low hydrogen:carbon ratio, but it is designed particularly for converting heavy unsaturated petroleum oils into gasoline.

An object of my invention is to obtain longer runs in a continuous hydrogenation process, to continually replace spent catalysts in the system with fresh or revivified catalyst and to continually remove the hydrogenated products and the non-hydrogenatable liquids from the digester.

A further object is to provide an improved digester capable of withstanding high pressures, which may be readily cleaned, and which may be heated and maintained at a uniform temperature. A further object is to provide a process wherein hot oil is circulated in a digester, first contacting a hot surface where it is heated and partially cracked, and then mixing with an incoming fresh mixture of oil, hydrogen and catalyst. The incoming mixture furnishes hydrogen for hydrogenating the circulated liquid, and the circulated liquid furnishes heat to further hydrogenate the incoming oil.

Other objects will be apparent from the detailed description of my invention.

I contemplate a system wherein a finely divided catalyst is suspended in a mixture of unsaturated oil and hydrogen. The mixture is raised to hydrogenation temperature in a pipe still and is then introduced into a conical digester near the apex thereof. The introduction of the mixture causes an upflow of the liquid in the center of the digester and a downflow at the sides thereof. Products which have been sufficiently hydrogenated are vaporized and removed from the top of the digester, while the liquid containing partially spent catalyst runs down the sides and meets the incoming stream containing an excess of hydrogen and fresh catalyst. The liquid running down the sides of the digester is heated to cracking temperature and is partially broken up into lighter compounds. When it enters the incoming mixture, it heats said mixture and causes further hydrogenation of the incoming oil, and at the same time it is hydrogenated by the unused hydrogen in said mixture. The heavier particles of catalyst and heavier liquids flow past the inlet nozzle and are removed from the appex of the digester. The hydrogenated products are removed as vapors cooled, condensed and separated, and the gas is scrubbed and returned with make-up hydrogen to incoming oil about to enter the heater. The invention will be more clearly understood from the following detailed description.

In the accompanying drawing I have diagrammatically illustrated my improved system and have shown my improved digester in section.

The oil to be hydrogenated may be of animal, vegetable, or mineral origin and it may be of any degree of saturation or viscosity, the nature of the catalyst and the reaction conditions being varied to suit the particular purpose. I preferably employ "gas oil" which may include high boiling pressure distillate, naphtha bottoms, and/or other hydrocarbon oils.

The oil is passed from the storage tank 10 by pipe 11 to pump 12 which subjects it to a pressure of about 200 atmospheres. It is then passed through pipe 13 to heat exchanger 14 where it absorbs the heat from the hydrogenated reaction products. From the exchanger it is passed by pipe 15 to a mixer 16, where hydrogen and a catalyst are incorporated into it. The mixture passes through a pipe 17, preheater tubes 18 and insulated pipe 21 to a point near the apex of digester 20.

The digester 20 is a conical tank with a spherical top and is designed to withstand pressures of 350 to 400 atmospheres. It is supported by brackets 21 near the top of the digester, which rest on the walls 22 of a furnace, which may be heated by suitable gas burners (not shown).

Since it is difficult to transfer heat through the thick walls of the digester, I prefer to supply the heat indirectly by circulating a fluid medium alternately through digester coils 23 and preheater coils 24. The fluid may be diphenyl or similar substance, the pressure of the fluid being regulated to make possible a temperature of about 850 to 950° F.

The lower end 25 of the conical digester is removable from the main body 26 thereof, and is secured thereto by bolts passing through heavy reinforcing flanges 27, the construction being similar to that employed for man-hole covers. The hot oil pipe 19 is led in through the lower end 25 of the digester and it terminates in an upwardly turned section 28. The apex of the digester terminates in a pipe 29, the opening of which is controlled by a valve 30.

A man-hole cover 31 is secured to the top of the digester and it carries vapor discharge pipe 32, which leads to heat exchanger 12. The vapors from the heat exchanger are then conveyed by pipe 33 to cooler 34, wherein the condensible portion is liquefied. The cooler may be a suitable tank 35 provided with a means 36 for introducing and removing cooling fluid.

The cooled fluid mixture is discharged through pipe 37 into liquid separator 38, the liquid being removed by pipe 39 through release valve 40.

The gases from the liquid separator are introduced by pipe 41 into the base of gas scrubber 42, which contains a suitable packing material 43 held on a screen 44. The liquid 45 which collects on the base of this tower is passed through pipe 46, release valve 47 and pipe 48 to gas release tank 49, the absorbed hydrogen sulfide, methane, etc., being discharged through pipe 50. The liquid from the base of tank 49 is passed through pipe 51, high pressure pump 52 and pipe 53 to nozzle 54, which distributes it in a spray over the packing material countercurrent to the flow of gases in the tower. The scrubbing liquid may be oil.

Purified hydrogen is removed from the top of scrubber tower through pipe 55, it is mixed with additional "make-up hydrogen" from high pressure line 56 and is then passed through pipe 57 to pump 58, which raises the pressure of the hydrogen sufficient to force it through the mixer 16, pipe still 18, and into digester 22.

Fresh catalyst, either dry or mixed with oil, is introduced by means of a closed hopper 59, which is capable of withstanding the high pressure and which communicates with the hydrogen line through valved discharge opening 60. While I prefer to introduce the catalyst at this point, it is understood I may mix a catalyst with the oil before it is heated and compressed, for instance, in pipe 11. Again the catalyst may be mixed directly with the oil instead of being carried into said oil by the hydrogen stream.

I do not limit myself to any particular catalyst, but I contemplate the use of metals and oxides of metals of the sixth group of the periiodic system. An example of such a catalyst is nine parts by weight of chromium oxide mixed with one part by weight of molybdenum oxide.

The operation of my invention may be described as follows: The oil to be hydrogenated is preheated and mixed with hydrogen and finely divided catalyst and the mixture is passed through the coils of pipe still 18, where it is heated to a temperature of about 650 to 850° F. A substantial amount of hydrogenation may occur in the pipe still before the mixture, together with the reaction products, is discharged therefrom through the upturned pipe 28 in digester 22.

The mixture of hydrogen, reaction products, oil, etc. is lighter than the mixture of liquids in the digester, so that there is an upward flow in the center of the digester, the hydrogen, gasoline vapors, and other vaporizable substances being released from the surface of the liquid and discharged through pipe 32. The oil which has not been hydrogenated flows down the sides of the digester, where it absorbs heat from coils 23 and is partially cracked. When it approaches the bottom of the cone it meets the incoming hydrogen mixture from pipe 28 and is again carried to the top of the digester in the presence of incoming hydrogen. The circulating oil imparts heat to the incoming mixture and thereby causes further hydrogenation of incoming oils. At the same time it is itself further hydrogenated by the hydrogen (which is introduced with the fresh oil) in the presence of the suspended catalyst. Additional fractions therefore will be converted and carried away by pipe 32 with each cycle. The spent catalyst tends to agglomerate and form heavier particles which slide down the walls of the cone past the inlet pipe 28. It may be impossible to hydrogenate the heavier portion of the liquid and this heavy liquid also flows down the side of the digester past the discharge opening. The spent catalyst and nonhydrogenatable liquid are withdrawn through pipe 29 in amounts regulated by valve 30. The catalyst is removed from the oil by filtration or by centrifuging and after washing with light hydrocarbon solvents it is revivified and returned to hopper 59 for further use.

The remainder of my process is obvious from the drawing and requires no further discussion. The hydrogen in line 56 is at a pressure somewhat higher than the hydrogen and the gas scrubber, so that the amount of make-up hydrogen added to the system may be regulated by the valve 56—A.

While I have described in detail a preferred embodiment of my invention, it is understood that I do not limit myself to the details therein set forth. The oil may be subjected to the high pressure before it enters the heat exchanger. Hydrogen and catalyst may also be introduced before the oil is preheated. Suitable fractionating and stripping devices may be used in place of the liquid separator, various modifications of pipe stills and furnace structure may be employed, etc.

I claim:

1. A thick walled digester designed to withstand pressure of about 200 atmospheres and of substantially entirely conical form with the apex of cone at the base, a conduit extending through the wall of the digester and arranged in coils around the inner side thereof in heat exchange relationship with the interior of said digester, means for circulating a completely independent heating fluid through said coils, means for introducing oil and a hydrogen containing gas near the base of said digester and below said coils, and means for removing reaction products at the top thereof.

2. An improved method for converting liquid carbonaceous materials into lower boiling hydrocarbon oils, which comprises discharging a heated stream of oil upwardly into the lower part of a vertically elongated reaction zone filled to a substantially high level with liquid, and converging conically substantially from the level of the liquid to an apex at the base thereof, maintained at a temperature of the order of 650 to 850° F. under high pressure of the order of 200 atmospheres, in the presence of free hydrogen, whereby the contents of the reaction zone is caused to circulate upwardly in a central region and downwardly along the sides, continuously withdrawing vaporous products from the upper portion of the reaction zone, and continuously withdrawing tarry products from the bottom portion of the zone at a point below that at which the oil stream discharges.

3. Process according to claim 2 in which the oil within the reaction zone is heated during its downward passage by indirect heat exchange with an independently circulated heating stream within the reaction zone.

4. Process according to claim 2 in which a finely divided catalyst is present in the reaction zone and is kept in suspension in the oil within the reaction zone by the oil circulation therein.

5. In an apparatus of the class described a substantially vertically disposed digester converging conically from a point substantially near the top thereof having an apex at the bottom and designed to withstand a pressure of the order of 200 atmospheres, a conduit extending through the walls of said digester and arranged in coils around the inner side of the midsection thereof in heat exchange relation with the interior of said digester, means for circulating a heating fluid through said coils, means for introducing a mixture of oil and a hydrogen-containing gas within said conically shaped section near the apex of said digester below said heating coils, and means for withdrawing reaction products from the top of said digester.

6. Apparatus according to claim 5, in which the digester has a quiescent zone below the point of introduction of said oil and gas mixture, and means for withdrawing residue from the apex.

7. A continuous process for converting liquid carbonaceous material into lower boiling hydrocarbon oils comprising heating a mixture of oil and hydrogen to a temperature of about 650° to 850° F. and discharging the heated mixture into the lower portion of a vertically elongated reaction zone converging conically from a point substantially at the liquid level, to an apex at the base thereof, above said apex whereby the zone is largely filled with liquid, heating said liquid by indirect heat exchange with an independently circulated heating stream within and adjacent to the sides of said reaction zone, whereby said mixture is maintained in continuous recirculation within said zone, withdrawing vaporous products from said zone at a point above the level of said liquid, and withdrawing tarry products from a quiescent zone below the point at which said heated mixture is introduced.

DONALD E. PAYNE.